United States Patent
Tomaru et al.

(10) Patent No.: US 6,389,053 B1
(45) Date of Patent: May 14, 2002

(54) SOLID-STATE LASER COMPENSATED FOR PUMPING-LIGHT ASTIGMATISM

(75) Inventors: Tatsuya Tomaru, Hatoyama; Hrvoje Petek, Moroyama, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/503,739

(22) Filed: Feb. 15, 2000

(30) Foreign Application Priority Data

Mar. 12, 1999 (JP) .............................. 11-066017

(51) Int. Cl.$^7$ .............................................. H01S 3/091
(52) U.S. Cl. .......................... 372/70; 372/70; 372/72; 372/92; 372/98; 372/101
(58) Field of Search .......................... 372/43, 92, 101, 372/98, 70, 72; 359/129, 131

(56) References Cited

U.S. PATENT DOCUMENTS 5,046,070 A * 9/1991 Negus .......................... 372/33
6,229,835 B1 * 5/2001 Tomaru et al. ............... 372/45
6,307,872 B1 * 10/2001 Tomaru et al. ............... 372/34

OTHER PUBLICATIONS

Applied Physics Letters, vol. 73, No. 15, Oct. 1998, pp. 2098–2100.
"Lasers", University Science Books, 1986, A.E. Siegman, pp. 581–584 & 784.
Applied Optics, vol. 26, No. 3, 1987, pp. 427–429.

\* cited by examiner

*Primary Examiner*—Frank G. Font
*Assistant Examiner*—Delma R. Flores Ruiz
(74) *Attorney, Agent, or Firm*—Mattingly Stanger & Malur, P.C.

(57) ABSTRACT

In a solid-state laser in which a gain crystal is polished to have the Brewster angle or a solid-state laser comprising a dichroic concave mirror to which light enters at an incidence angle which is not zero, astigmatism generally occurs in pumping light. By tilting a focusing lens for pumping light with respect to the optical axis of the pumping light, the astigmatism is compensated. The tilting angle is determined in such a manner that synthetic focusing points in the sagittal and tangential planes, of a series optical system of a focusing lens, a dichroic concave lens, and a gain crystal are calculated and the focusing points almost coincide with focusing points in a cavity mode.

16 Claims, 4 Drawing Sheets

SOLID-STATE LASER COMPENSATED FOR PUMPING-LIGHT ASTIGMATISM

BACKGROUND OF THE INVENTION

The present invention relates to a solid-state laser compensated for pumping-light astigmatism.

In order to efficiently oscillate a solid-state laser, it is important to focus a pumping-light beam on the inside of a gain crystal. This is especially important in the case where a solid-state laser is Kerr-lens mode locked. An ordinary Kerr-lens mode locked laser includes a gain crystal polished to have the Brewster angle and a dichroic concave mirror (which functions as a concave lens for pumping-light) in a cavity. The gain crystal and the dichroic concave mirror cause astigmatism in pumping-light according to an incidence angle. As a result, the focusing of the pumping-light beam is incomplete. At the worst case, the Kerr-lens mode locking is not obtained. In order to overcome the problem, for example, a solid-state laser known as the trademark "Model 3960" of Spectra-Physics Lasers Inc. employs a concave mirror to focus pumping light, thereby compensating for the astigmatism caused by the gain crystal and the concave lens.

Adjustment of a pumping light focusing system employing a concave mirror is, however, difficult more than the case of using a lens. Consequently, an easier method using a lens is desired.

On the other hand, widely, a pumping light focusing system is constructed only by lenses without using the concave mirror. In this case, generally, the astigmatism is not taken into account. Recently, however, a technique which suppresses the astigmatism by optimizing overlapping of a cavity mode and the pumping-light beam by empirically tiling a focusing lens by about 5 degrees with respect to the normal has been reported (Y. Chang et al., Applied Physics Letters, Volume 73, Number 15, pp. 2098 to 2100 (1998)).

The tilt of about 5 degrees with respect to the normal described in the paper is, however, an angle adapted only to the reported laser and does not generally optimize the overlapping between the cavity mode and the pumping light beam in an arbitrary solid-state laser. Since the angle is not theoretically determined, there may be an angle which is more suitable.

SUMMARY OF THE INVENTION

It is an object of the invention to provide a method which can be generally used for optimally compensating astigmatism in pumping light, a focusing system for pumping light is constructed only by lenses. This method provide a solid-state laser in which astigmatism in pumping light is optimally compensated. Specifically, astigmatism caused by a gain crystal or a concave lens is compensated on purpose by tilting a convex-shaped focusing lens for pumping light about the axis that is perpendicular to the tangential plane, where the tangential plane is defined as that of propagation of light and a sagittal plane is defined as that perpendicular to the tangential plane. When the configuration of the focusing system of pumping light of a laser is determined, the tilting angle of the focusing lens can be theoretically, unconditionally determined.

The focusing lens, the concave lens, and the gain crystal are optical devices which are arranged in series having the same optical axis. A synthetic focusing point of the three elements in a sagittal plane and that in a tangential plane are independently calculated as functions of the tilting angle of the focusing lens. When the tilting angle of the focusing lens is selected so that the focusing points coincide with focusing points in the respective planes in the cavity mode, astigmatism-compensated pumping light is obtained. The invention is achieved by paying attention to the above.

In the laser cavity, a gain crystal and a dichroic concave mirror are provided. The dichroic concave mirror functions as a concave mirror in the cavity mode to obtain a focus on the inside of the gain crystal and functions as a concave lens for pumping light. The position and angle of the focusing lens are designed so that the pumping light passes through the focusing lens and the concave lens and comes into a focus in the gain crystal so as to almost coincide with the focusing point in the cavity mode. When the focusing point in the sagittal plane and that in the tangential plane do not coincide with each other, however, astigmatism occurs and a laser does not operate as a stable Kerr-lens mode-locked laser. According to the invention, therefore, the focusing lens is tilted with respect to the optical axis of pumping light, and a synthetic focusing point of the focusing lens, the concave lens, and the gain crystal in a sagittal plane and that in a tangential plane are independently calculated as functions of the tilting angle of the focusing lens. The tilting angle of the focusing lens is determined so that the focusing points almost coincide with focusing points in the respective planes in the gain crystal in the cavity mode.

DESCRIPTION OF THE PREFERRED EMBODIMENTS

Embodiment I

Figure 1:
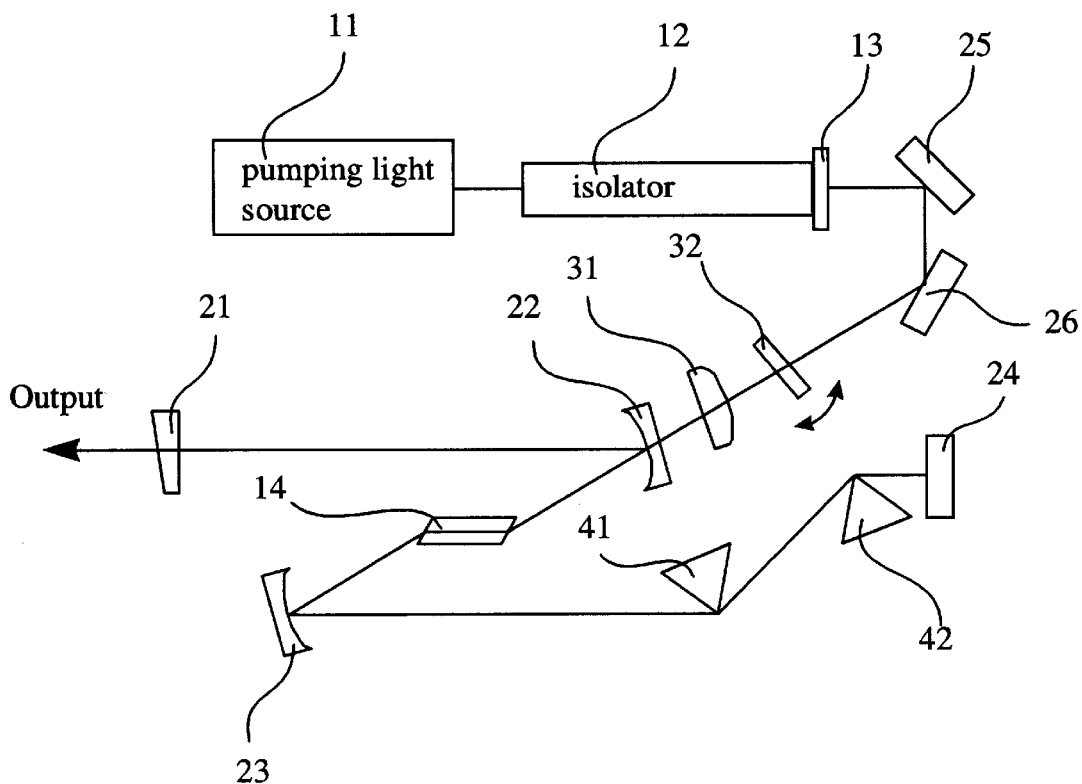
FIG. 1 is a diagram showing an example of the configuration of a solid-state laser of Embodiment I according to the invention.

FIG. 1 shows an example of the configuration of a Kerr-lens mode locked solid-state laser. In a laser cavity, mirrors 21 and 24 are used as end mirrors and a dichroic mirror 22, a gain crystal 14 polished to have the Brewster angle, a mirror 23, and Brewster dispersion prisms 41 and 42 are interposed between the mirrors 21 and 24. Light emitted from a pumping light source 11 transmits an isolator 12 and a λ/2 wave plate 13 and the travel direction of the light is adjusted by mirrors 25 and 26. After that, the light passes through a plate 32 for beam axis adjustment and is focused by a focusing lens 31 and the concave lens (dichroic mirror) 22 on the inside of the gain crystal 14. The concave lens (dichroic mirror) 22 acts as a concave lens for pumping light and acts as a concave mirror for a laser cavity.

In order to obtain the Kerr-lens mode locking, it is necessary to make a focusing point of a beam in the cavity mode on the inside of the gain crystal 14. Usually, the cavity is designed so that the focusing point in a sagittal plane and the focusing point in a tangential plane coincide with each other. In practice, however, the focusing points in the sagittal plane and the tangential plane do not coincide with each other.

It is also necessary to focus pumping light on the inside of the gain crystal 14 so as to coincide with the focusing point in the cavity mode. Since astigmatism occurs in the pumping light due to refraction on the Brewster plane of the gain crystal 14 and the tilted concave lens 22, the focusing point of the pumping light cannot coincide with the focusing points in the cavity mode in both of the sagittal and tangential planes. The astigmatism which is caused by the gain crystal 14 and the concave lens 22 is therefore compensated by tilting the focusing lens 31 in the same or opposite direction as the tilting direction of the concave lens 22 with respect to the optical axis of the pumping light, thereby coinciding the focusing point in the cavity mode with the focusing point of the pumping light in both of the sagittal and tangential planes.

In order to determine the tilting angle of the focusing lens 31, a general Equation of giving astigmatism has to be obtained first. In the following example, a theory using an ABCD matrix (for example, A. E. Siegman, Lasers, University Science Books, Mill Valley, Calif. (1986) pp. 581–584) will be described.

Figure 2:
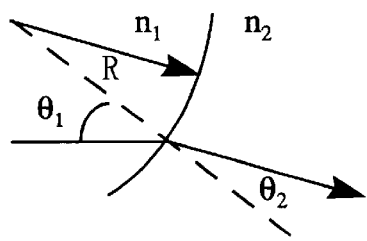
FIG. 2 is a diagram showing light which is refracted by a curved surface with the radius R of curvature.

As shown in FIG. 2, when a medium with a refractive index $n_1$ and a medium with a refractive index $n_2$ are in contact with each other at the radius R of curvature and light incident at an incidence angle $\theta_1$ from the medium with the refractive index $n_1$ is refracted at a refraction angle $\theta_2$ to the medium with the refractive index $n_2$, the ABCD matrix expressing the refraction in the sagittal plane and that of the tangential plane are given by Equation 1 and Equation 2, respectively (for example, J. P. Tache, Applied Optics, Vol. 26, No. 3, pp. 427–429 (1987)).

$$M_{ss} = \begin{pmatrix} 1 & 0 \\ \dfrac{n_2\cos\theta_2 - n_1\cos\theta_1}{n_2 R} & \dfrac{n_1}{n_2} \end{pmatrix}$$ (Equation 1)

$$M_{st} = \begin{pmatrix} \dfrac{\cos\theta_2}{\cos\theta_1} & 0 \\ \dfrac{n_2\cos\theta_2 - n_1\cos\theta_1}{n_2 R \cos\theta_1 \cos\theta_2} & \dfrac{n_1\cos\theta_1}{n_2\cos\theta_2} \end{pmatrix}$$ (Equation 2)

When the curved surface is directed to the opposite side, $-R$ is set instead of R. In order to distinguish the sagittal and tangential planes from each other, suffixes s and t are used. The suffixes will be also used hereinbelow in a similar manner.

The ABCD matrix when light propagates only by a distance L through a medium with a refractive index n is given by Equation 3.

$$\begin{pmatrix} 1 & L/n \\ 0 & 1 \end{pmatrix}$$ (Equation 3)

Figure 3A:
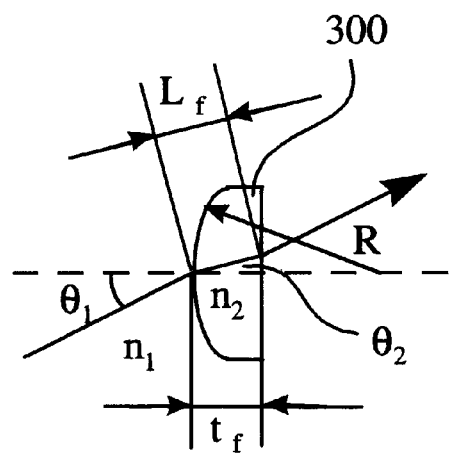
FIG. 3A is a diagram showing light which is refracted by a plano-convex lens and FIG. 3B is an equivalent diagram expressed by a very thin convex lens and space.

When Equations 1 and 3 are used, the ABCD matrix of a lens 300 of the medium with the refractive index $n_2$ shown in FIG. 3A is obtained by Equation 4 with respect to the sagittal plane. $t_f$ denotes the thickness of the lens and $L_f$ denotes a propagation distance in the lens.

$$M_{fs} = \begin{pmatrix} 1 & 0 \\ 0 & \dfrac{n_2}{n_1} \end{pmatrix} \begin{pmatrix} 1 & L_f \\ 0 & 1 \end{pmatrix} \begin{pmatrix} 1 & 0 \\ \dfrac{n_2\cos\theta_2 - n_1\cos\theta_1}{-n_2 R} & \dfrac{n_1}{n_2} \end{pmatrix}$$

$$= \begin{pmatrix} 1 - L_f \dfrac{n_2\cos\theta_2 - n_1\cos\theta_1}{n_2 R} & \dfrac{n_1}{n_2} L_f \\ -\dfrac{n_2\cos\theta_2 - n_1\cos\theta_1}{n_1 R} & 1 \end{pmatrix}$$ (Equation 4)

It should be noted that $L_f$ in the second matrix is not $L_f/n_2$ since the effect of the refraction is already expressed by matrices on both sides. Since the ABCD matrix of a very thin lens of the focal distance f is expressed by Equation 5, Equation 4 is equivalent to a synthetic ABCD matrix of a thin lens 311 of a focal distance $f_s$ and space 312 having a space length $t_s$ shown in FIG. 3B, which are expressed by Equations 6 and 7.

$$f_s = \dfrac{n_1 R}{n_2\cos\theta_2 - n_1\cos\theta_1}$$ (Equation 6)

$$t_s = \dfrac{n_1}{n_2} L_f$$ (Equation 7)

Similarly, Equations 8, 9, and 10 are given with respect to the tangential plane.

$$M_{ft} = \begin{pmatrix} \dfrac{\cos\theta_1}{\cos\theta_2} & 0 \\ 0 & \dfrac{n_2\cos\theta_2}{n_1\cos\theta_1} \end{pmatrix} \begin{pmatrix} 1 & L_f \\ 0 & 1 \end{pmatrix} \begin{pmatrix} \dfrac{\cos\theta_2}{\cos\theta_1} & 0 \\ \dfrac{n_2\cos\theta_2 - n_1\cos\theta_1}{-n_2 R \cos\theta_1 \cos\theta_2} & \dfrac{n_1\cos\theta_1}{n_2\cos\theta_2} \end{pmatrix}$$

$$= \begin{pmatrix} 1 - L_f \dfrac{n_2\cos\theta_2 - n_1\cos\theta_1}{n_2 R\cos^2\theta_2} & \dfrac{n_1\cos^2\theta_1}{n_2\cos^2\theta_2} L_f \\ -\dfrac{n_2\cos\theta_2 - n_1\cos\theta_1}{n_1 R\cos^2\theta_1} & 1 \end{pmatrix}$$ (Equation 8)

$$f_t = \dfrac{n_1 R\cos^2\theta_1}{n_2\cos\theta_2 - n_1\cos\theta_1}$$ (Equation 9)

$$l_t = \frac{n_1\cos^2\theta_1}{n_2\cos^2\theta_2} L_f$$ (Equation 10)

Figure 4A:
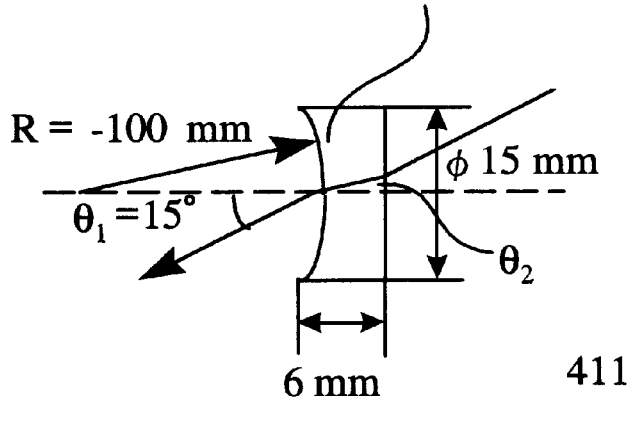
FIG. 4A is a diagram showing light which is refracted by a plano-concave lens and FIG. 4B is an equivalent diagram expressed by a very thin concave lens and space.
Figure 4B:
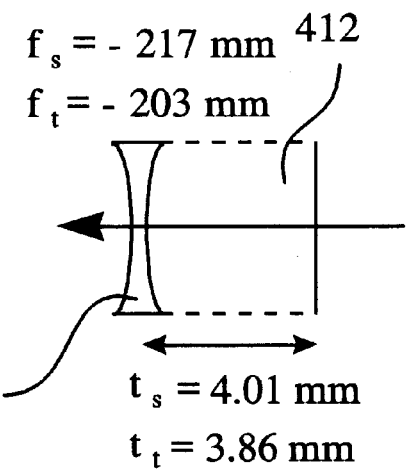

When a theory similar to the above is applied to a concave lens 400 made of a synthetic fused silica with refractive index $n_2$=1.44963 (at wavelength of 1064 nm) shown in FIG. 4A, as shown in FIG. 4B, it can be expressed by a thin lens 411 having a focal distance $f_s$ or $f_t$ and a space 412 having a space length $t_s$ or $t_t$, where $f_s$=−217 mm, $t_s$=4.01 mm, $f_t$=203 mm, and $t_t$=3.86 mm.

Figure 3B:
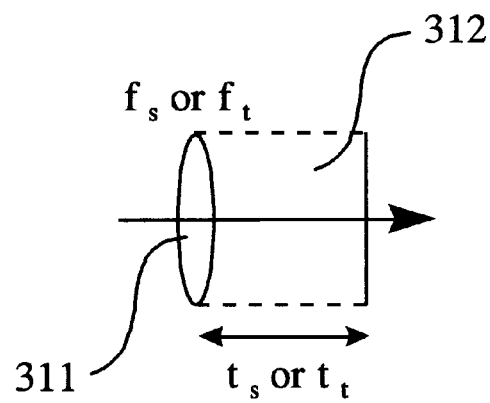
Figure 5:
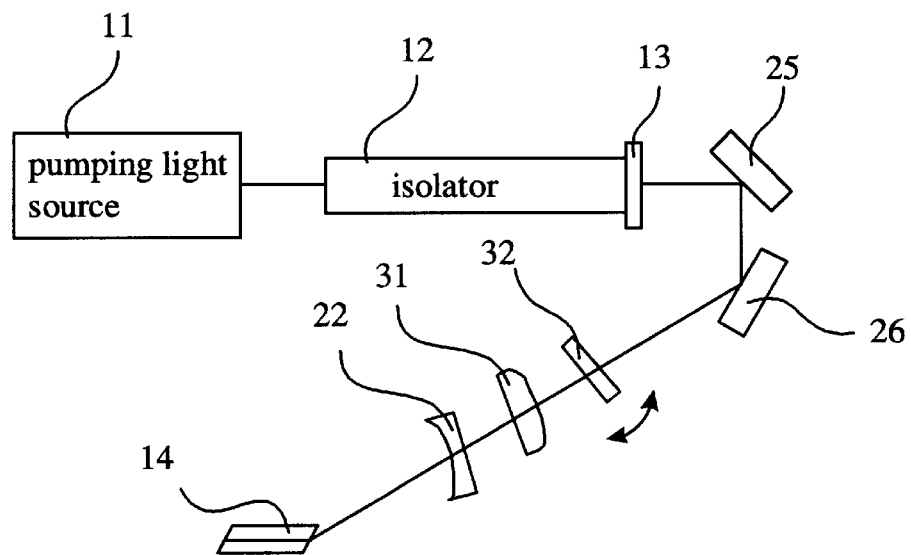
FIG. 5 is an explanatory diagram of only a part related to pumping light, of the configuration of FIG.
Figure 6:
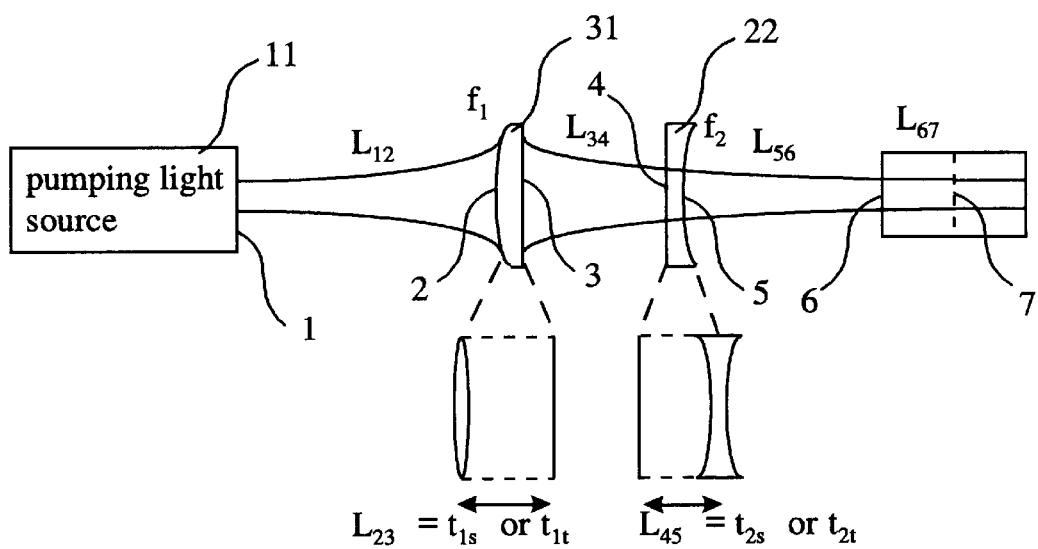
FIG. 6 is an explanatory diagram in which main elements of FIG. 5 are rearranged linearly.

FIG. 5 shows only elements related to the pumping light in the configuration of the solid-state laser shown in FIG. 1. In FIG. 6, from the elements, only the pumping light source 11, the focusing lens 31, the concave lens 22, and the gain crystal 14 are rearranged on a straight line for simplicity. The isolator 12, the λ/2 wave plate 13, and the plate 32 for beam axis adjustment which do not exert a substantial influence are omitted here. For each of the focusing lens 31 and the concave lens 22, Equations equivalent to the thin lens and space length shown in FIGS. 3B and 4B are also given.

A synthetic ABCD matrix of a path from a pumping light outgoing plane 1 of the pumping light source 11 to an arbitrary plane 7 in the gain crystal is given by Equation 11 with resect to a sagittal plane $M_{17s}$.

$$M_{17s} = \begin{pmatrix} 1 & L_{56} + \frac{L_{67}}{n_{YAG}} \\ 0 & 1 \end{pmatrix} \begin{pmatrix} 1 & 0 \\ -\frac{1}{f_{2s}} & 1 \end{pmatrix} \begin{pmatrix} 1 & t_{2s} + L_{34} + t_{1s} \\ 0 & 1 \end{pmatrix} \begin{pmatrix} 1 & 0 \\ -\frac{1}{f_{1s}} & 1 \end{pmatrix} \begin{pmatrix} 1 & L_{12} \\ 0 & 1 \end{pmatrix}$$

$$\equiv \begin{pmatrix} A & B \\ C & D \end{pmatrix}$$ (Equation 11)

where, suffix 1 appearing in $f_{1s}$ and $t_{1s}$ corresponds to the focusing lens 31 and suffix 2 appearing in $f_{2s}$ and $t_{2s}$ corresponds to the concave lens 22. $L_{ij}$ ($L_{12}$, $L_{34}$, $L_{56}$, $L_{67}$) shows an equivalent distance between a plane (i) and a plane (j). $n_{YAG}$ denotes a refractive index of the gain crystal 14. When a Cr:YAG crystal is used, $n_{YAG}$=1.82 (at the wavelength of 1064 nm). In the tangential plane, it is sufficient to replace the suffix s with t and to replace $n_{YAG}$ with $(N_{YAG})^3$. The latter replacement is performed because the gain crystal 14 is polished so as to have the Brewster angle. This will be understood from the fact that when R=∞ and tan $\theta_1$=$n_2$($n_1$= 1) as a parameter of the Brewster angle are substituted for Equation 8, Equation 12 is obtained.

$$\begin{pmatrix} 1 & L_f/n_2^3 \\ 0 & 1 \end{pmatrix}$$ (Equation 12)

When the initial parameters on the outgoing plane 1 of the pumping light are known, the beam radius in the arbitrary plane 7 in the gain crystal 14 can be calculated by using the synthetic ABCD matrix. The method will now be described.

A beam parameter $q_i$ on an arbitrary plane (i) is defined by Equation 13.

$$\frac{1}{q_i} = \frac{1}{R_i} - j\frac{\lambda}{\pi w_i^2}$$ (Equation 13)

where $R_i$ denotes a radius of curvature on the plane (i), $w_i$ indicates a beam radius in the plane (i), and λ denotes a wavelength. Since the outgoing plane 1 of the pumping light is an outgoing port of the pumping light source 11, it is sufficient to set $R_1$=∞ and substitute the beam radius of the pumping light source for $w_1$. When the beam parameter $q_i$ on the outgoing plane 1 is determined, the beam parameter on the arbitrary plane 7 in the gain crystal 14 can be calculated by Equation 14 (for example, A. E. Siegman, Lasers, University Science Books, Mill Valley, Calif. (1986) p784).

$$q_7 = \frac{Aq_1 + B}{Cq_1 + D}$$ (Equation 14)

When the light comes into a focus on the arbitrary plane 7 in the gain crystal 14, $R_7$=∞ The plane of $R_7$=∞ is changeable by the position and angle of the lens 31. When it is achieved that the plane of $R_7$=∞ coincides with the focusing point in the cavity made with respect to both the sagittal and tangential planes, those parameters are the solution for astigmatism compensation of pumping light.

A cavity of a symmetric Cr:YAG laser (with the length of the gain crystal of 20 mm) is taken as an example. When it is assumed that the focusing point is achieved in the center of the gain crystal 14, L=$L_{12}$+$L_{34}$=770 mm, $L_{56}$=49.4 mm, the beam radius $w_1$ of the pumping light source 11=0.15 mm, and $R_1$=∞ at the outgoing port of the pumping light source 11, an Nd:YVO$_4$ laser having an oscillation wavelength of 1064 nm is used as the pumping light source 11, the concave lens 22 made of a synthetic fused silica having the dimension as shown in FIG. 4 is used, and the focusing lens 31 made of a synthetic fused silica, having the radius R of curvature=33.7 mm and a thickness $t_f$=5.0 mm is employed, the tilting angle of the focusing lens 31 is 10.9°. Although the mode locking is obtained in the range of about ±3° of the angle, its characteristics are degraded as the angle is deviated from 10.9°.

The tilting angle of 10.9° is a calculation value in an ideal state. In practice, fine adjustment is necessary around the angle. There are various causes of deviation from the ideal state.

(1) In the case where the cavity is not of a symmetrical type, the case where the cavity is of a symmetrical type but the gain crystal is deviated from the center of the cavity, or the like, the focusing point in the sagittal plane and that in the tangential plane in the gain crystal of a beam in the cavity mode do not coincide with each other and astigmatism remains. In this case, it is necessary to leave the astigmatism of the pumping light so as to match it with the remained cavity-mode astigmatism. The calculating method is similar to the above when the focusing point in the sagittal plane and that in the tangential plane in the cavity mode are determined.

(2) The beam in the cavity mode is not accurately focused in the gain crystal for various nonlinear effects such as nonlinear effect based on heat generation by absorption of the pumping light, self-focusing effect or self-guiding effect based on the Kerr effect of the gain crystal, the position dependence of the pumping which occurs since the pumping light travels while being absorbed in the gain crystal, and cavity mode correcting effect which is produced when overlapping between a beam in the cavity mode and the pumping light beam is inadequate. The astigmatism of the pumping light has to be compensated in consideration of the beam in the cavity mode.

Besides the above effects, in a nonuniform crystal such as a Cr:YAG crystal, its nonuniform effect is also added. Since the laser oscillation is a nonlinear phenomenon, it is very complicated. In actual adjustment, it is preferable to obtain the optimum value by testing some tilting angles around the calculation result as a center.

As the focusing lens 31 is tilted, the optical axis of the pumping light is accordingly deviated. In order to compensate the deviation, it is effective to use the plate 32 for beam axis adjustment as one of the components especially when the tilting angle of the focusing lens 31 is fine adjusted. When the plate 32 is made of the same material as that of the focusing lens 31 and has the same thickness as the thickness $t_f$ of the focusing lens 31, the tilting angle of the plate 32 is theoretically equal to that of the focusing lens 31 but their orientations are opposite.

Mode-locked solid-state lasers require accurate alignment, which makes its manufacturing difficult. Especially for a laser such as the Cr:YAG laser which is not easily mode-locked, the compensation of astigmatism which has been described in the invention is extremely useful.

It will be briefly described by using the following two embodiments that the invention is also useful in other embodiments in which the structure of the gain crystal and the arrangement of the lens and the concave mirror are different from those in the embodiment shown in FIG. 1.

Embodiment II

Figure 7:
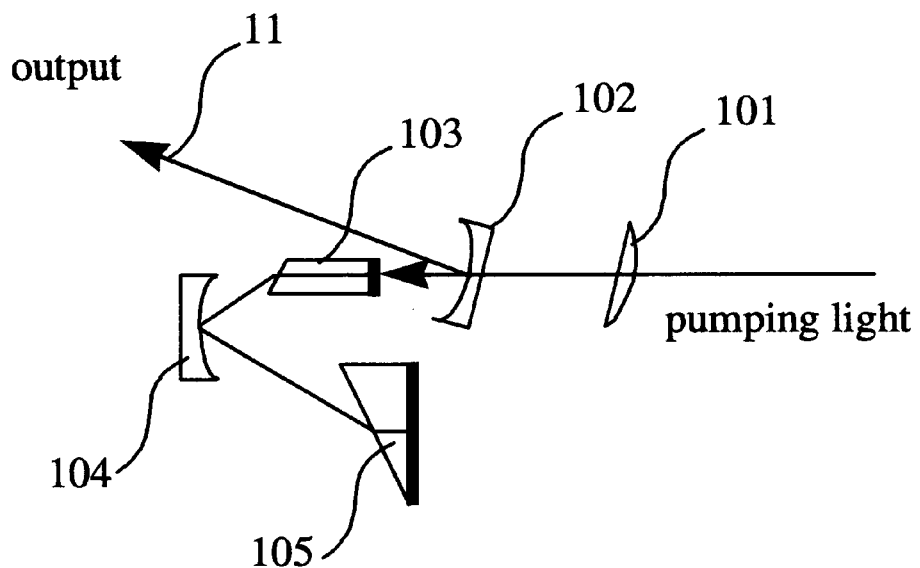
FIG. 7 is a diagram showing an example of the configuration of a main part of a solid-state laser of Embodiment II according to the invention.

The configuration of the embodiment is shown in FIG. 7. A cavity comprises a gain crystal 103, a concave mirror 104, and a Littrow prism 105. The black-painted plane of the gain crystal 103 and the black-painted plane of the Littrow prism 105 serve as end mirrors. A pumping light incident plane (painted plane) of the gain crystal 103 is polished to be normal to the optical axis of the cavity mode. Light from the cavity goes out from the painted plane of the gain crystal 103 and is reflected by a concave mirror 102. The concave mirror 102 is high reflection coated for the wavelength of the outgoing light and is antireflection coated for the pumping light.

In the embodiment, the pumping light is focused on the black-painted plane of the gain crystal 103 by a focusing lens 101. Since astigmatism occurs in the pumping light due to the concave mirror 102 (which acts as a concave lens for the pumping light), the focusing lens 101 is tilted to compensate the astigmatism.

Embodiment III

Figure 8:
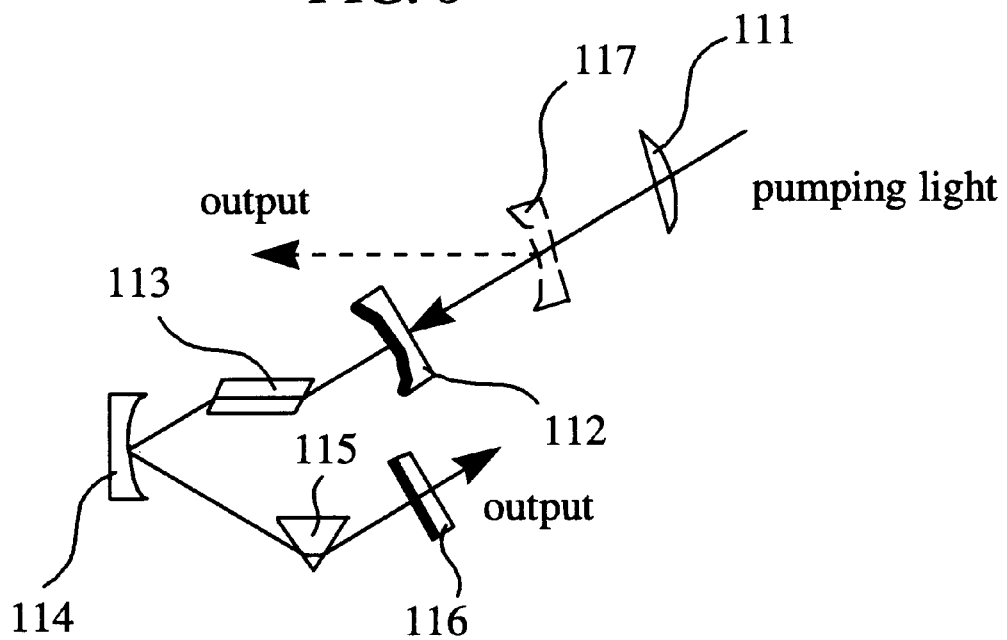
FIG. 8 is a diagram showing an example of the configuration of a main part of a solid-state laser of Embodiment III according to the invention.

The configuration of the embodiment is shown in FIG. 8. A cavity comprises elements of a concave mirror 112, a gain crystal 113, a concave mirror 114, a prism 115, and an end mirror 16. The black-painted plane of each of the concave mirror 112 and the end mirror 116 serves as an end mirror. Outgoing light is obtained from the end mirror 116. The outgoing light may be derived from the painted plane of the concave mirror 112, returned by a concave mirror 117 shown by a broken line and led as shown by a broken line.

Although the pumping light is focused on the inside of the gain crystal 113 by a focusing lens 111 in the embodiment, since the gain crystal 113 is not polished to be normal to the optical axis of the cavity mode, astigmatism occurs. The lens 111 is tilted so as to compensate the astigmatism.

When the outgoing light is led from the concave mirror 112, the concave mirror 117 is disposed in the position shown by a broken line and the outgoing light is returned by the concave mirror 117. The concave plane of the concave mirror 117 is high reflection coated for the wavelength of the outgoing light and is antireflection coated for the pumping light. In this case, the astigmatism has to be compensated by the focusing lens 111 by considering that the astigmatism is caused by not only the fact that the gain crystal 113 is not polished to be normal to the optical axis of the cavity mode but also the fact that the concave mirror 117 is tilted. In this case as well, as described above, it is sufficient to independently calculate the focusing point in the sagittal plane and that in the tangential plane and determine the tilting of the focusing lens 111 so that the focusing points coincide with the focusing points in the cavity mode in the planes, respectively.

Although only the case where the gain crystal is polished to have the Brewster angle or to be normal to the optical axis of the cavity mode has been described in the embodiment, the invention can be also similarly applied to a case where the gain crystal is polished at an arbitrary angle in accordance with design of the cavity mode. For example, there are following cases. When the astigmatism is desired to be reduced more, the gain crystal is polished to have an angle smaller than the Brewster angle. When both sides of the gain crystal are to be polished to be normal to the optical axis of the cavity mode, one side or both sides of the gain crystal is/are polished so as not to be perfectly normal to the optical axis of the cavity mode in order to prevent interference by multiple reflection. The cases can be applied to both sides of the gain crystal 14 in FIG. 1 or 8.

According to the invention, the stability and reliability of the mode locking of the solid-state laser are improved and a laser such as a Cr:YAG laser which is not easily mode-locked can be also, easily manufactured.

What is claimed is:

1. A solid-state laser comprising a laser cavity which introduces pumping light into a gain crystal via a focusing lens and a dichroic concave mirror, wherein the focusing lens is tilted with respect to the optical axis of the pumping light so that a focusing point of the pumping light in a sagittal plane and a focusing point of the pumping light in a tangential plane in the gain crystal almost coincide with focusing points in the respective planes in the gain crystal in a cavity mode.

2. The solid-state laser according to claim 1, wherein the pumping light incident plane of the gain crystal is polished to have the Brewster angle or to be deviation from the right angle with respect to the optical axis of the cavity mode.

3. The solid-state laser according to claim 1, wherein the pumping light incident plane of the gain crystal is polished to have the right angle with respect to the optical axis of the cavity mode.

4. The solid-state laser according to claim 1, wherein the tilting angle of the focusing lens is changed within a certain range around the predetermined tilting angle at which the focusing points of the pumping light in the sagittal and tangential planes in the gain crystal almost coincide with the focusing points in the respective planes in the gain crystal in the cavity mode.

5. The solid-state laser according to claim 2, wherein the tilting angle of the focusing lens is changed within a certain range around the predetermined tilting angle at which the focusing points of the pumping light in the sagittal and tangential planes in the gain crystal almost coincide with the focusing points in the respective planes in the gain crystal in the cavity mode.

6. The solid-state laser according to claim 3, wherein the tilting angle of the focusing lens is changed within a certain range around the predetermined tilting angle at which the focusing points of the pumping light in the sagittal and tangential planes in the gain crystal almost coincide with the focusing points in the respective planes in the gain crystal in the cavity mode.

7. The solid-state laser according to claim 1, further comprising a plate for beam axis adjustment to be disposed between the pumping light source and the focusing lens.

8. A solid-state laser comprising:
  (a) a laser cavity having a gain crystal and two end mirrors;
  (b) a pumping light source for supplying pumping light to be led to the gain crystal;
  (c) a dichroic concave mirror for introducing the pumping light to the gain crystal and constructing the laser cavity or deriving outgoing light; and
  (d) a lens for focusing the pumping light on the inside of the gain crystal in the laser cavity,
  wherein the focusing lens is tilted with respect to the optical axis of the pumping light so that the focusing point of the pumping light in a sagittal plane and that in a tangential plane in the gain crystal almost coincide with the focusing points in the respective planes in the gain crystal in the cavity mode.

9. The solid-state laser according to claim 8, wherein the pumping light incident plane of the gain crystal is polished to have the Brewster angle or to be deviated from the right angle with respect to the optical axis of the cavity mode.

10. The solid-state laser according to claim 8, wherein the pumping light incident plane of the gain crystal is polished to have the right angle with respect to the optical axis of the cavity mode.

11. The solid-state laser according to claim 8, wherein the tilting angle of the focusing lens is changed within a certain range around the predetermined tilting angle at which the focusing points of the pumping light in the sagittal and tangential planes in the gain crystal almost coincide with the focusing points in the respective planes in the gain crystal in the cavity mode.

12. The solid-state laser according to claim 10, wherein the tilting angle of the focusing lens is changed within a certain range around the predetermined tilting angle at which the focusing points of the pumping light in the sagittal and tangential planes in the gain crystal almost coincide with the focusing points in the respective planes in the gain crystal in the cavity mode.

13. The solid-state laser according to claim 9, wherein the tilting angle of the focusing lens is changed within a certain range around the predetermined tilting angle at which the focusing points of the pumping light in the sagittal and tangential planes in the gain crystal almost coincide with the focusing points in the respective planes in the gain crystal in the cavity mode.

14. The solid-state laser according to claim 8, further comprising a plate for beam axis adjustment to be disposed between the pumping light source and the focusing lens.

15. The solid-state laser according to claim 8, wherein the laser cavity comprises a gain crystal whose pumping light incident plane is polished to be normal to the optical axis of the cavity mode, a concave mirror, and a Littrow prism, and the pumping light incident plane of the gain crystal and the plane opposite to a light incident plane of the Littrow prism serve as end mirrors.

16. The solid-state laser according to claim 8, wherein the laser cavity comprises a dichroic concave mirror, a gain crystal, a concave mirror, and an end mirror, the pumping light incident plane of the gain crystal is polished to have the Brewster angle, and the pumping light enters the gain crystal via the dichroic concave mirror.

* * * * *